United States Patent [19]

Trento

[11] Patent Number: 5,375,959
[45] Date of Patent: Dec. 27, 1994

[54] FRAMES FOR THE STORAGE OF SHEETS AND HEAVY LOADS WITH PARAVERTICAL ORIENTATION IN WAREHOUSES AND DISCHARGE MEANS WITH A HORIZONTAL CARRIAGE

[76] Inventor: Bruno Trento, Via Curzola, 11 Padova, Italy

[21] Appl. No.: 946,391

[22] Filed: Sep. 17, 1992

[30] Foreign Application Priority Data

Sep. 24, 1991 [IT] Italy .............. VI91A000152

[51] Int. Cl.$^5$ ................................. B65G 1/04
[52] U.S. Cl. ............................ 414/277; 414/743
[58] Field of Search ................. 414/19–20, 414/277, 280, 286, 778, 743; 312/323

[56] References Cited

U.S. PATENT DOCUMENTS

| 3,780,881 | 12/1973 | Friel ...................... 414/778 |
| 3,853,234 | 12/1974 | Stobb ..................... 414/403 |
| 4,109,805 | 8/1978 | Wagner .................... 414/277 |
| 4,619,575 | 10/1986 | Summa et al. ........... 414/286 X |
| 4,838,749 | 6/1989 | Potocjnak ................ 414/277 |
| 5,024,576 | 6/1991 | Meschi ................. 414/331 X |
| 5,156,519 | 10/1992 | Johansson .............. 414/778 X |

FOREIGN PATENT DOCUMENTS

| 0245778 | 5/1987 | German Dem. Rep. ........... 414/778 |
| 0267613 | 11/1986 | Japan ........................... 414/778 |

*Primary Examiner*—Michael S. Huppert
*Assistant Examiner*—James W. Keenan
*Attorney, Agent, or Firm*—Bucknam and Archer

[57] ABSTRACT

The frames contain a predetermined number of packages (2), mounted with an almost vertical orientation. The packages are extracted with a device which comprises a carriage (3), provided with a platform (10) for the discharge, along which the tray (4) with the sheets and heavy loads is allowed to run. The extraction is carried out by placing the platform in horizontal position, by a maneuver achieved by use of cylinder (12) while the stored sheets and heavy material are lifted with cylinders (18) and (19) so that the removal is easily obtained.

2 Claims, 6 Drawing Sheets

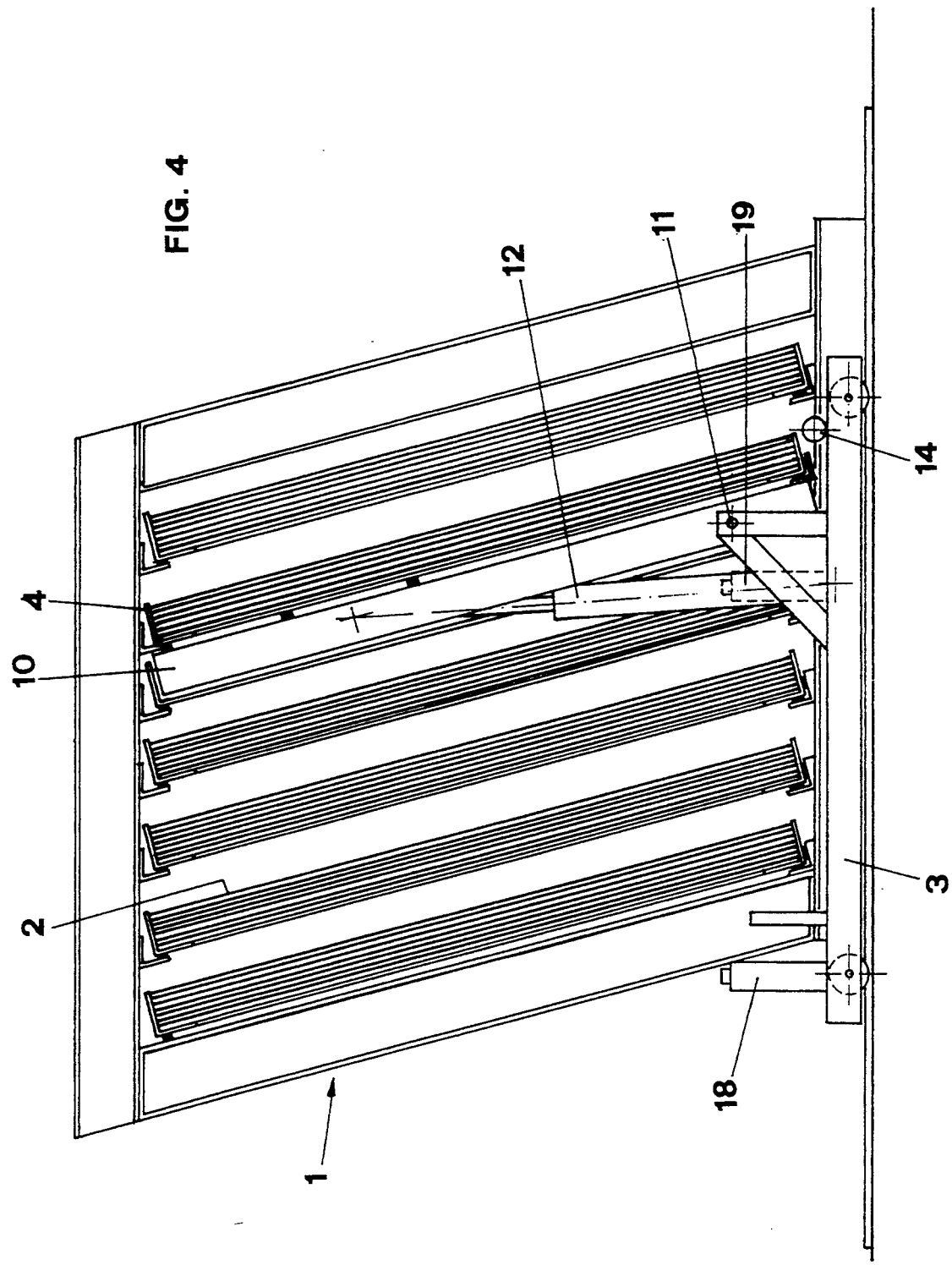

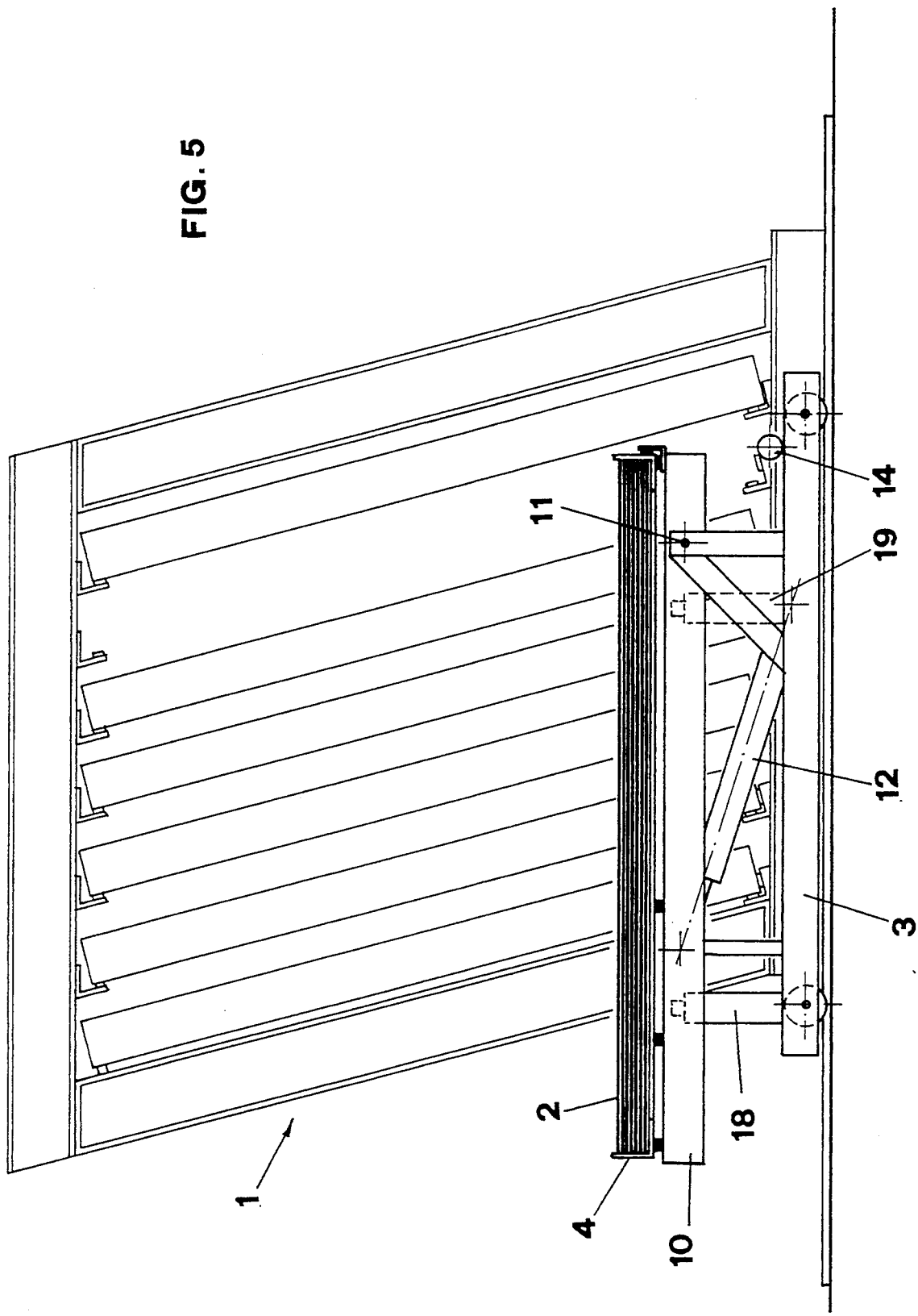

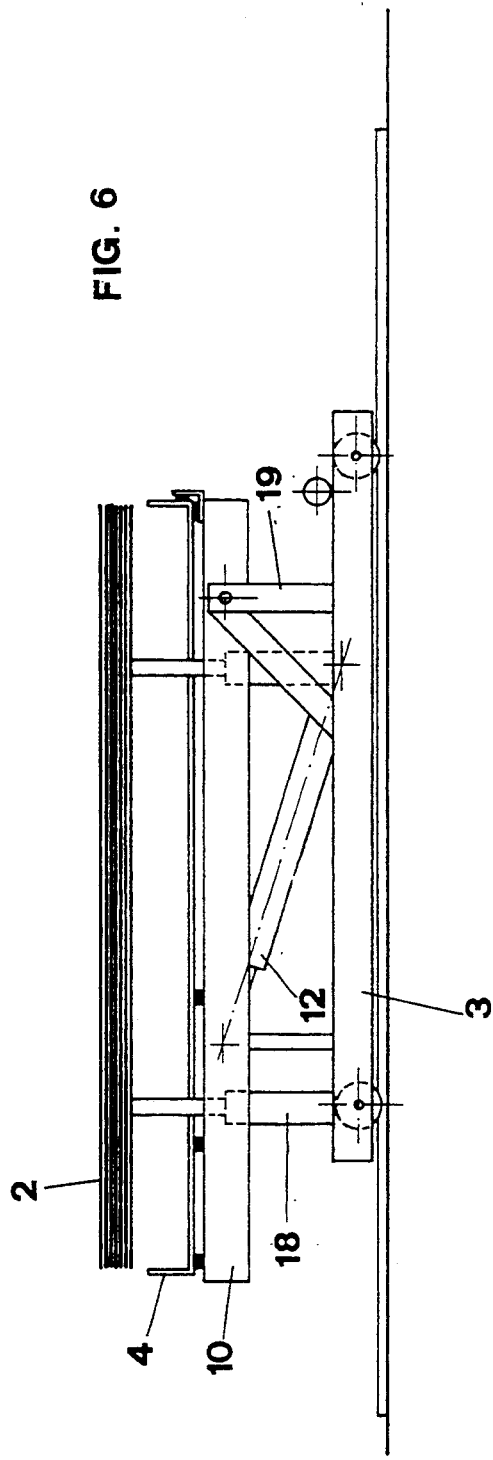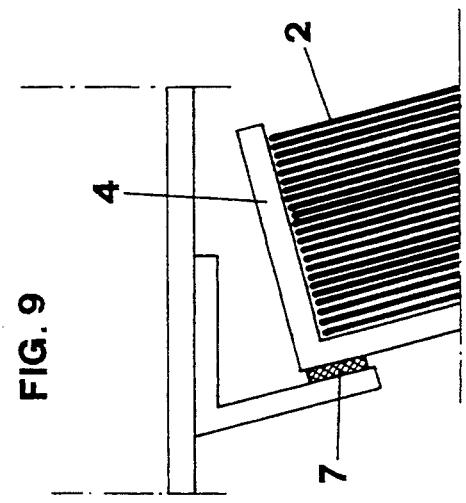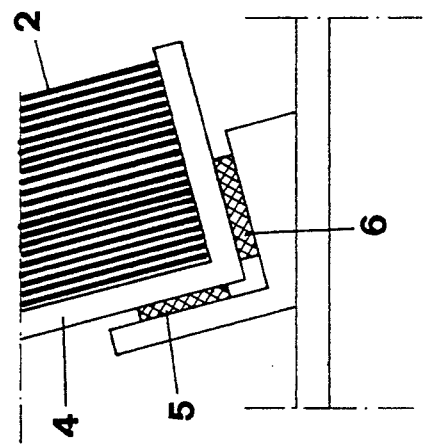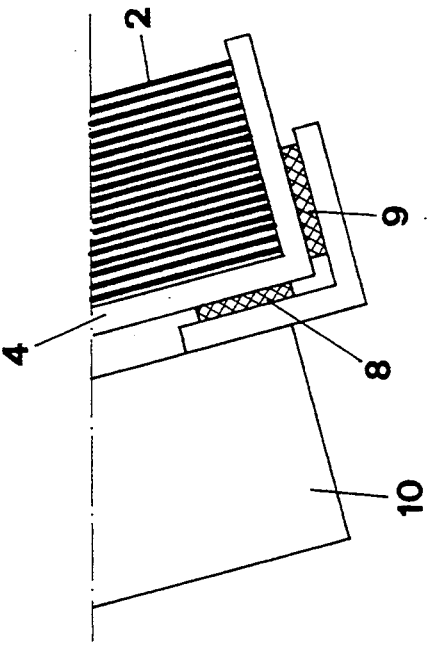

FRAMES FOR THE STORAGE OF SHEETS AND HEAVY LOADS WITH PARAVERTICAL ORIENTATION IN WAREHOUSES AND DISCHARGE MEANS WITH A HORIZONTAL CARRIAGE

The present invention relates to frames for sheets and heavy loads, and more specifically to frames to be used in warehouses in which the sheets and heavy loads have an almost vertical orientation. One essential feature of the present invention resides in the fact that the frames are provided with means for removal of the material comprising a horizontal carriage, a fact which simplifies substantially the operation of discharge of the material from the frame and substantially reduces the danger of the installation, a fact which is particularly important in the case of heavy loads, because frequently the load may be as much as 7,000 kilograms and even greater in a single package.

It is well known that the warehouses used in the distribution of heavy objects and particularly iron sheets or sheets made of a similar material exhibit always substantial danger in the maneuvering of stowage and the discharge of the same material, both because of the substantial weight of the material as well as the difficulty of containing the material in the suitable frames.

The resulting dangers are even greater the greater the height to which the items must be stored and from which the packages of material in the warehouse must be discharged, a danger which first of all exposes the people allocated to these operations and also the equipment itself which in case of an accident may be substantially damaged.

An object of the present invention is to rationalize the operations of loading and discharging the material, thus rendering the equipment less dangerous, reducing to the minimum the possibility of accidents to the people allocated to the operations and decreasing the risk of substantial damage of the equipment caused by the same accidents.

An essential feature of the present invention, which distinguishes from frames known in the art, is the possibility of storing the packages of sheets or similar material with an almost vertical orientation.

Another feature of the present invention is the utilization of a carriage, movable along the warehouse, capable of receiving one of the packages and capable of bringing the package in the horizontal position by means of a piston device and lifting it from the container by means of other piston devices so that it is available for the removal of one or more sheets or similar material from the same package.

The above mentioned features permit, in addition, to reduce substantially the space occupied by the warehouse and the time required for the operations of loading and discharging, with substantial advantages with respect to the cost involved.

The invention will be described hereinbelow in more detail with reference to the accompanying drawings of which:

FIG. 4 is a side view of the frame with the carriage ready to receive a package of the sheets to be discharged.

FIG. 5 is a side view of the frame with the carriage placed in front of the frame and with a package of sheets resting on the tray.

FIG. 6 shows the carriage used for the discharge with the sheets in the package in the horizontal position raised with respect to the container.

FIG. 7 is a bottom view of the package to be removed.

FIG. 8 is an upper view of the package being removed.

FIG. 9 shows the lower part of the package being removed, mounted on the movable tray of the carriage.

Figure 1:
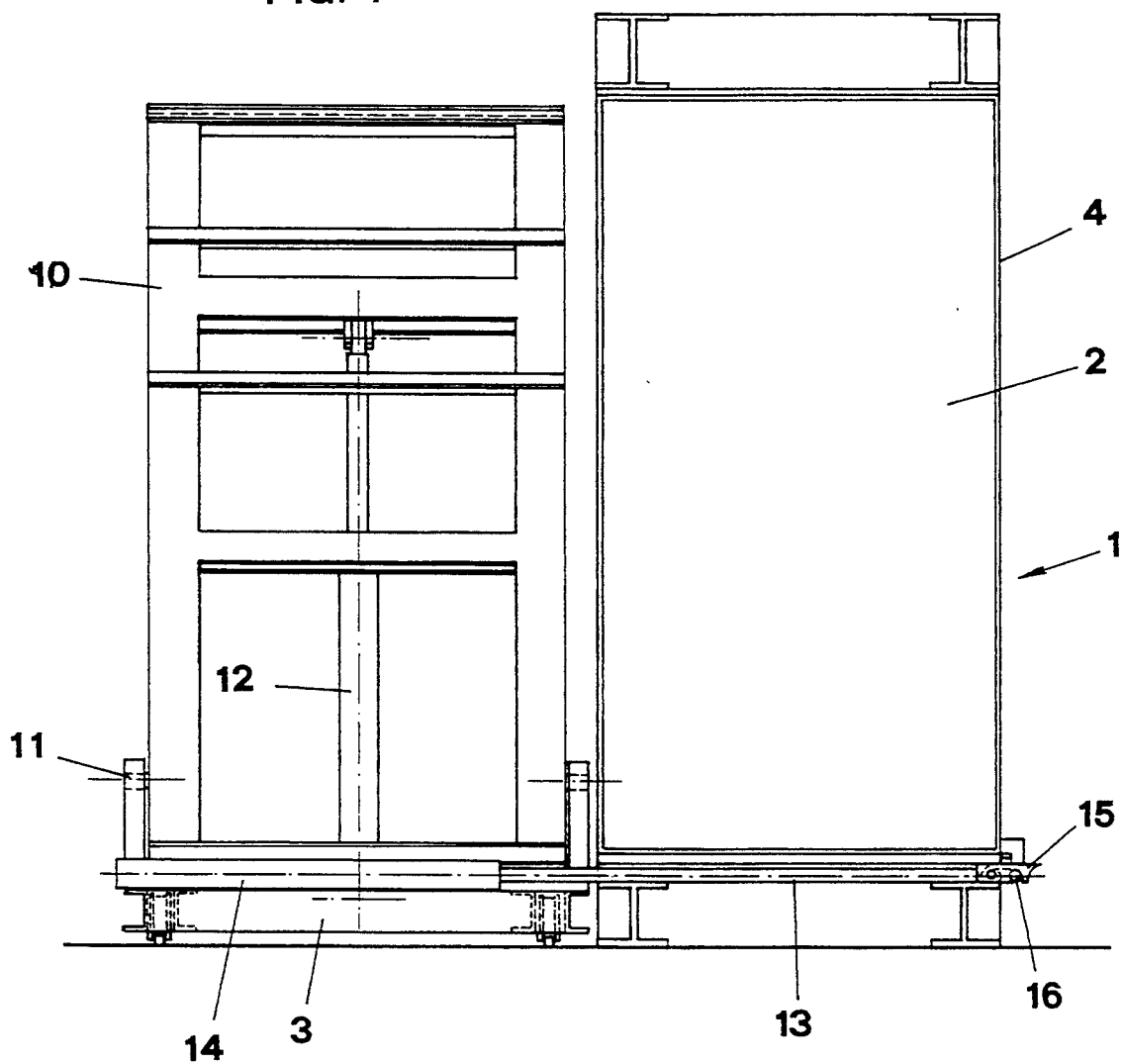
FIG. 1 is an overall front view of the frame of the present invention with the packages of sheets completely stored in the frame.

As shown in FIG. 4, the frame (1), according to the present invention comprises a certain number of packages of sheets designated by numeral (2) placed in an almost vertical position while the carriage (3) provides for the removal from the frame of one of the packages contained in the frame to put it in a horizontal position and subsequently, after having removed the required sheets from the package, places the package again in the frame, again in the almost vertical position.

As shown in FIG. 7, each package of sheets is supported by tray (4) which slides on slides (5 and 6) made of plastic material, a fact which permits the tray to move properly without excessive friction.

Similarly, in the upper part, the tray (4) as shown in FIG. 8 slides on slide (7) which is also made of a plastic material. FIG. 9 on the contrary shows that the tray (4) when it is laterally displaced rests on slides (8 and 9) which are carried on the platform (10), the latter rotating on pin (11) shown in FIG. 4, under the action of the piston of the control cylinder (12).

Figure 10:
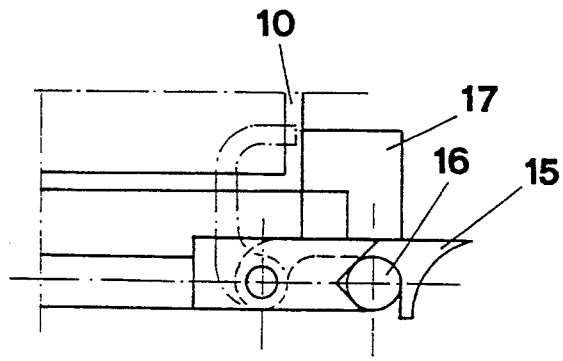
Fig.10 illustrates the hooking of the stem of the pistons being used for the extraction with a movable carriage.

As better shown in FIG. 1, the tray (4) which contains the selected package of sheet (2) from which one or more sheets must be removed, is grasped by a suitable hook which is located at the extremity of piston (13), the latter being movable in cylinder (14) and which is provided by the grasping hook (15) as better shown in FIG. 10. This hook (15) grasps the tie-rod (16) supported by bracket (17), the latter being connected to tray (4).

Figure 2:
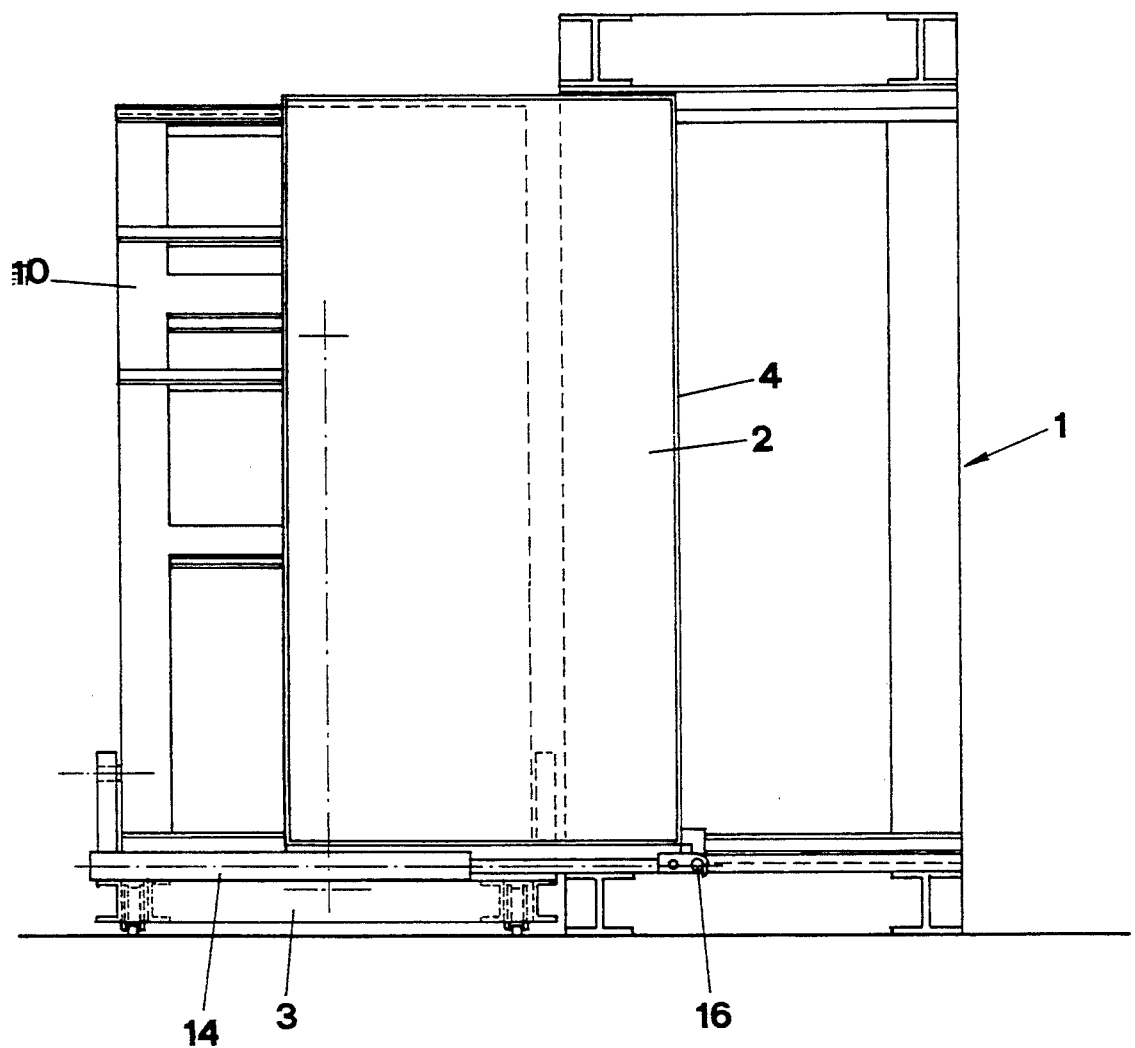
FIG. 2 shows the frame with the package of sheets partially placed on the carriage being used for the removal of the material.

FIG. 2 shows the tray (4) partially extracted from the frame (1) and partially inserted on the discharge platform (10).

Figure 3:
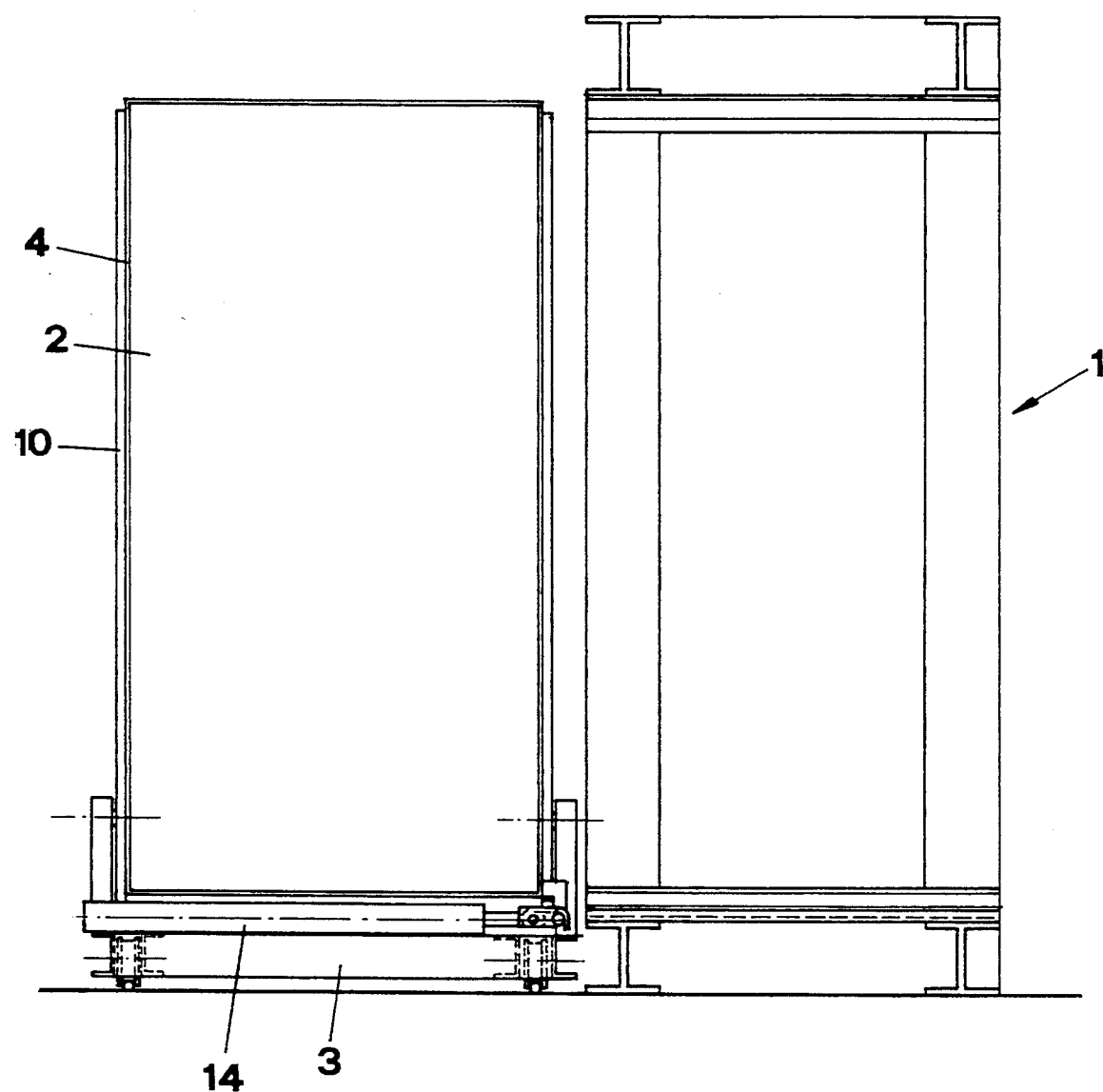
FIG. 3 shows the frame with the package of sheets completely placed on the carriage for the discharge of material.

FIG. 3 shows the package completely extracted from the frame (1) and now mounted on platform (10). At this stage, platform (10) is lowered as shown in FIG. 4 by means of a cylinder (12) up to the point of being brought in a horizontal position as shown in FIG. 5, rotating on pin (11). The sheets contained on tray (4) are raised by the pistons of cylinders (18 and 19) as shown in FIG. 6 in a number obviously of four in such manner as to be brought in such a position that easy removal of one or more sheets is possible depending upon the requirement.

Subsequently, the pistons cause the sheets remaining on tray (4) to be lowered while cylinder (12) brings the platform (10) again in the almost vertical position, thus permitting the re-introduction of frame (1) from which the platform had been removed.

All these operations are carried out with great simplicity and practically without any risk for the operator, a fact which is fundamental for safe working conditions.

Obviously, the same carriage may serve a substantial number of frames because an average warehouse may need about 100 packages of sheets which may be distributed along a wall of about 28 meters while there is only one carriage available. It is clear of course that a single carriage may be used with a number of frames which may vary depending on the size of the warehouse.

Advantageously the control of the structures which are used to actuate the several phases of operation of the frame may be computerized.

The dimensions and the characteristics of the materials being in the warehouse may vary because with the same carriage one may remove packages of sheets or packages of other material which may have different dimensions but always within the scope of the present invention. The same applies to the details of construction which have been described hereinabove by way of the example illustrated in the drawings but which are not intended to limit the invention which may have different forms while the essential features of the invention remain unchanged.

What is claimed is:

1. A frame for storing packages of heavy articles in a warehouse, and for extracting a predetermined number of said heavy articles, said frame being arranged in a row of a plurality of frames, said frame having an almost vertical orientation and having a predetermined number of trays (4), said frame comprising discharge means, said discharge means including a horizontal carriage (3) and a platform (10), said platform being in the almost vertical position during storage, said carriage sliding along said row of said frames when a predetermined number of said articles are to be extracted, first hydraulic means (14) engageable with one of said trays and comprising a cylinder with piston (13) and hooking means (15) connectable to one of said trays (4), first slides (5,6,7) for sliding one of said trays onto said carriage (3), second hydraulic means (12) for placing said discharge platform (10) from the almost vertical to a horizontal position, whereby a predetermined number of said packages are transferred to said platform (10), said platform carrying second slides (8)(9), third hydraulic means (18,19) each having a vertical axis and located on said carriage (3) for lifting a predetermined number of said articles to be extracted, said one of said trays sliding on said second slides (8,9) when it is laterally displaced, said second hydraulic means (12) causing said platform to return to its almost vertical position after the operation of extraction of said predetermined number of articles has ended.

2. The frame according to claim 1 wherein said platform (10) under the action of said second hydraulic means rotates on a pin (11).

* * * * *